United States Patent [19]
Pellowski

[11] 3,747,259
[45] July 24, 1973

[54] ANIMAL TRAP AND TRAP HOLDER
[76] Inventor: Daniel W. Pellowski, R 2, Arcadia, Wis.
[22] Filed: Apr. 10, 1972
[21] Appl. No.: 242,461

[52] U.S. Cl.............................. 43/90, 43/92, 43/96
[51] Int. Cl........................................... A01m 23/26
[58] Field of Search ..................... 43/90, 92, 96, 88

[56]  References Cited
UNITED STATES PATENTS
| | | | |
|---|---|---|---|
| 2,543,826 | 3/1951 | Bigelow | 43/90 |
| 2,947,107 | 8/1960 | Lehn | 43/92 |
| 1,465,528 | 8/1923 | Rufty | 43/88 |
| 3,461,600 | 8/1969 | Boudreau | 43/96 |
| 1,858,713 | 5/1932 | Martin | 43/96 |
| 1,201,427 | 10/1916 | Angvick | 43/96 |

Primary Examiner—Russell R. Kinsey
Assistant Examiner—Daniel J. Leach
Attorney—D. Paul Weaver et al.

[57] ABSTRACT

An animal trap formed of a pair of jaws movable towards each other under spring tension and an arrangement for adjusting the spring tension. A trap holder for the trap is formed of a pole, a clamp clamped to the pole, and a clamp member located above the clamp and to which the trap is secured and which releasably engages the pole.

12 Claims, 7 Drawing Figures

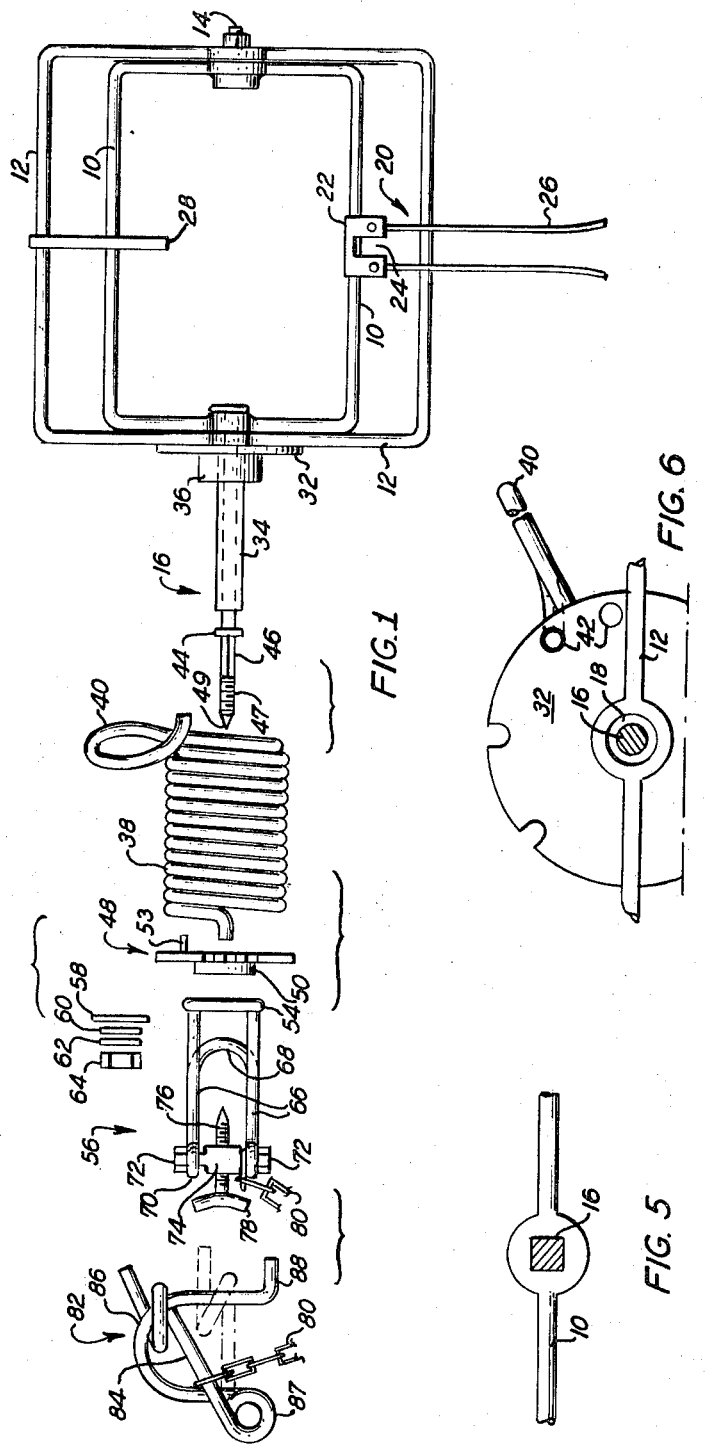

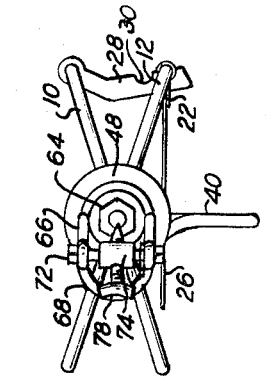
FIG. 4
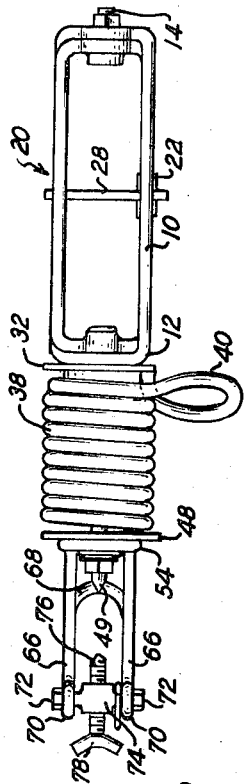
FIG. 3
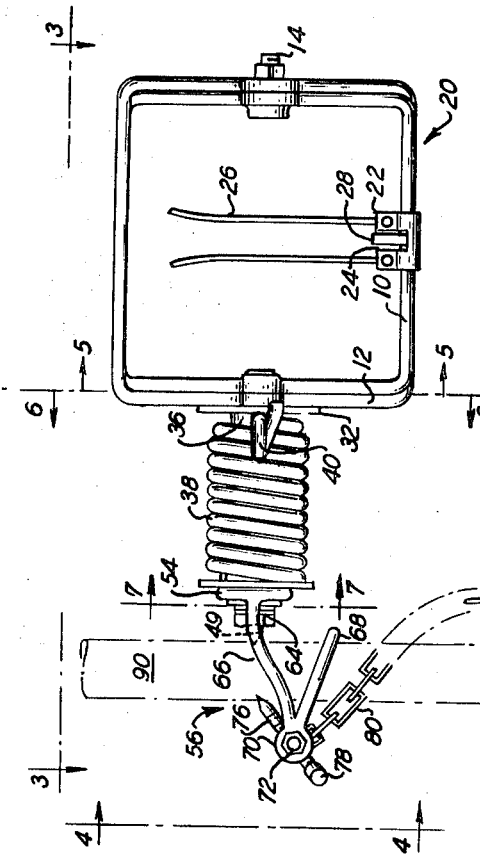
FIG. 2
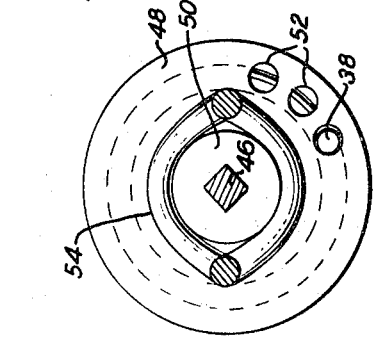
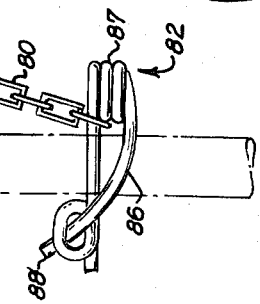
FIG. 7

ANIMAL TRAP AND TRAP HOLDER

BACKGROUND OF THE INVENTION

Animal traps which are formed of a pair of jaws that are held apart by a catch and which can be moved towards each other under the spring tension of a spring when the catch is released by an animal are known in the prior art as exemplified by U.S. Pat. No. 411,606, 2,543,826, 3,421,251, and 3,426,471. Because cold weather adversely affects the tension of the spring, the use of the trap in cold weather adversely affects its efficiency.

Animal traps mounted on poles that are immersed in a body of water to trap animals swimming in the water are also known in the prior art as exemplified by U.S. Pat. No. 1,201,427. It has been found desirable when using such a trap to have the trap located near the surface of the water where it is in a good position to trap an animal and then have the trap located at a lower level on the pole.

SUMMARY OF THE INVENTION

A first aspect of this invention is concerned with a trap of the type described above in which the adverse effect of the cold weather is overcome. This is accomplished by providing an adjusting arrangement for adjusting the tension of the spring when the trap is set with the catch holding the jaws apart under the spring tension.

A second aspect of the invention is concerned with a holder for the trap that enables the trap to move downwardly of the pole after an animal is caught in the trap. To accomplish this end, a limit stop member is located on the pole and a clamp member, having the trap secured thereto, is located on the pole above the limit stop member. The clamp member is so constructed as to releasably engage the pole so that a struggling animal caught in the trap causes the clamp member, together with the trap, to descend on the pole until the clamp member engages the limit stop.

BRIEF DESCRIPTION OF THE DRAWING

FIG. 1 is an exploded view of the trap and the trap holder;

FIG. 2 is a side elevation of the trap mounted to the pole by the trap holder;

FIG. 3 is a plan view taken on the line 3—3 of FIG. 2;

FIG. 4 is an end view taken on the line 4—4 of FIG. 2;

FIG. 5 is a section taken on the line 5—5 of FIG. 2;

FIG. 6 is a view taken on the line 6—6 of FIG. 2; and

FIG. 7 is a view taken on the line 7—7 of FIG. 2.

DESCRIPTION OF THE PREFERRED EMBODIMENT

The trap comprises jaws 10 and 12 that are pivoted to each other at their outer and inner ends. The jaws are pivoted to each other at their outer ends by a bolt 14. The inner end of the jaw 10 has a square aperture (FIG. 5) that receives a square portion of a bolt 16 so that the jaw 10 and the bolt 16 can turn in unison relative to the jaw 12. The jaw 12 has an enlarged opening 18 (FIG. 6) that receives a circular portion of the bolt 16 so that the bolt 16 and the jaw 12 may rotate with respect to each other.

A trigger assembly 20 is pivotally mounted to the jaw 10. The trigger assembly is formed of a sleeve 22 that is rotatable on the jaw 10, a notch 24 in the sleeve 22, and a pair of rods 26 that extend away from the sleeve 22.

A catch 28 is pivoted to the jaw 12. The catch has a plurality of notches 30 (FIG. 4) formed therein.

A collar 32 and a sleeve 34 are welded to each other and to the jaw 12 and extend inwardly of the jaw 12. The collar 32 and the sleeve 34 have circular apertures extending therethrough that receive a circular portion of the bolt 16 so that the bolt 16 may rotate with respect to the collar and the sleeve. The collar 32 has an annular projection 36 extending inwardly thereof that projects inwardly of the outer end of a spiral spring 38 to thereby seat the spiral spring. The spiral spring 38 comprises a spring rod formed into a series of convolutions of substantially uniform diameter and a loop 40 at its outer end of larger diameter than the diameter of the convolutions. The outer end of the spring 38 at the loop 40 is inserted into one of a plurality of holes 42 (FIG. 6) formed on the periphery of the collar 32.

The bolt 16 projects outwardly of the sleeve 34 and has an annular disc 44 fitted thereto outwardly of the sleeve 34. Outwardly of the disc 44, the bolt 16 is formed into a portion 46 having a square cross-section. Outwardly of the portion 46, the bolt is formed into a threaded portion 47 that terminates in a pointed end 49. A collar 48, having an outwardly directed flange 50, bears against the outer end of the spring 38 with the outer end of the spring rod inserted into a selected hole 52 (FIG. 7) in the collar 48. The bolt portion 46 is received within a square opening extending through the collar 48 and the flange 50 so as to preclude relative rotation between the bolt portion 46 and the collar 48. A spring rest 53 extends inwardly of the collar 48 and is received within the spring 38 to thereby retain the spring 38 in place against the collar 48.

A base 54 of a clamp member 56 is rotatably mounted on the collar flange 50 and is held in place thereon between the collar 48 and a washer 58 that is non-rotatably mounted to the bolt portion 46 by virtue of having a square opening extending therethrough that is complemental to the square periphery of the bolt portion 46. The washer 58 is held in position on the bolt portion 46 by washers 60 and 62 that are mounted on the bolt portion 47 and a nut 64 that is threaded onto the bolt portion 47.

The clamp member 56 has a pair of spaced legs 66 that extend inwardly of the base 54 and are welded to a U-shaped seat 68 that extends inwardly of the inner ends of the legs 66. The junction of the legs 66 and the seat 68 is formed into loops 70 (FIG. 2) that rotatably receive bolts 72. The inner ends of the bolts 72 are threaded into opposite ends of a clamp bracket 74 that has a clamp bolt or finger 76 threaded therethrough that may be manipulated by a winged end 78.

A chain 80 extends between one of the bolts 72 and a torsion clamp 82. The clamp 82 is made of a spring rod that has a straight portion 84 and a looped portion 86. The looped portion 86 is resiliently urged towards the straight portion 84 by a coiled portion 87 and may be moved away from the straight portion by pressing on an extension 88 of the looped portion.

The trap is used to trap an animal, such as a mink, a muskrat, or a marten, while it is swimming below the water. The trap is placed on a pole 90 (FIG. 2) by opening the torsion clamp 82 by pressing on the extension 88 and inserting the pole between the clamp portions 84 and 86 and sliding the clamp 82 along the pole 90 to a desired location on the pole as described below. The extension 88 is then released to thereby clamp the torsion clamp 82 to the pole 90. While the clamp 82 is being slid along the pole 90, the clamp member 56 is slid along the pole with the pole extending between the legs 66 and within the seat 68 and with the clamp bolt 76 spaced from the pole. The bolts 72 had been adjusted so that the clamp bolt 76 extends towards the pole and away from the torsion clamp 82. After the torsion clamp 82 is clamped to the pole 90, the clamp member 56 is clamped to the pole by rotating the winged end 78 so as to cause the clamp bolt 76 to move towards the pole into engagement therewith as shown in FIG. 2. In this position, the seat 68 and the bolt end 49 bear against the opposite side of pole 90 from the side engaged by the clamp bolt 76, thus holding the trap out at a right angle to the axis of the pole.

The trap is set by swinging the jaw 12, together with the collar 32, away from the jaw 10 about the axis of the bolt 16 to a position wherein a notch 30 of the catch 28 can be inserted into the notch 24 of the trigger assembly 20 (FIG. 4). In this set position, the spring 38 is tensioned and the rods 26 extend inwardly of the jaw 10 (FIG. 2). If desired, bait may be impaled on the rods 26.

The pole 90 is then lowered into a body of water such as a pond with the torsion clamp 82 below the clamp member 56 close to a place where the animals congregate such as a feeder house or breeder house. The pole is impaled in the bottom of the pond with the top of the pole extending above the pond. The engagement of the rods 26 by an animal will swing the sleeve 22 about the jaw 10 so as to disengage the catch 28 from the sleeve 22 and cause the jaws 10 and 12 to swing towards each other under the force of the spring 38 and catch the animal therebetween.

Since the axis of the clamp bolt 76 extends upwardly and away from the torsion clamp 82, the forces exerted by the struggling animal cause the clamp member 56 together with the trap to slide downwardly of the pole until it engages the torsion clamp 82 which thus acts as a limit stop member to limit the downward movement of the trap. It is advantageous to have the trap, including the jaws 10, 12, initially near the surface of the water in the path of travel of the animals and then have the trap move to the lower level of the torsion clamp 82 so that the fur of the animal is not damaged by freezing in ice that may be in the pond. In addition, by enabling the trap to move together with the caught animal to the lower level, other animals such as raccoons or foxes are prevented from eating the trapped animal.

In order to retrieve the trapped animal, it is merely necessary to lift the pole 90 out of the pond.

In cold weather, the spring 38 loses its strength and becomes slow or sluggish. In order to counteract this effect, the tension of the spring 38 can be increased by grasping the loop 40 so as to move the outer end of this spring out of the hold 42 in which it is inserted and insert it into another hole 42. The tension of the spring 38 can be loosened by reversing this procedure. The spring rest 53 helps in retaining the spring 38 in position during these adjustments of the spring tension.

If desired, the trap can be mounted to the pole 90 with the axis of the clamp bolt 76 extending at right angles to the axis of the pole 90 so that the trap will not slide downwardly of the pole.

I claim:
1. An animal trap comprising:
   a pair of jaws pivotally mounted with respect to each other;
   a first collar connected to the first of said jaws for movement therewith;
   a second collar connected to the second of said jaws for movement therewith;
   a spring member having a pair of opposed ends, said spring member being disposed between said first and second collars, said first collar having a plurality of stop members for engagement by one end of said spring, said one end of such spring member being releasably engaged with a selected one of said stop means on said first collar, the other end of said spring being releasably engaged with the second of said collars;
   releasable catch means mounted on said jaws for holding said jaws apart when said trap is set;
   trigger means for releasing said catch means when an animal moves said tripper means; and
   means enabling movement of said one end of said spring for engagement with a selected one of said stop members.

2. The trap according to claim 1 wherein said spring is a coil spring formed of a plurality of convolutions and said means enabling movement of said one end of said spring comprises: a loop extending outwardly of the convolutions at said one end of said spring which is manipulable to move said one end of said spring into and out of engagement with a selected one of said stop members on said first collar.

3. A trap according to claim 1 further comprising: a bolt extending through said first jaw for unitary movement therewith and extending through said second jaw so as to permit relative movement therebetween; wherein said first collar is connected to said bolt for unitary movement therewith; and wherein said second collar is connected to said second jaw for unitary movement therewith and so as to permit relative movement between the bolt and the second collar.

4. The trap according to claim 3 wherein said spring is a coil spring formed of a plurality of convolutions extending about said bolt and said means enabling movement of said one end of said spring comprises: a loop extending outwardly of the convolutions at said one end of said spring which is manipulable to move said one end of the spring into and out of engagement with a selected one of said stop members on said first collar.

5. A trap as claimed in claim 1 wherein said stop members on said first collar comprise a plurality of spaced openings in said first collar for selective engagment by said one end of said spring member.

6. A trap as claimed in claim 1 wherein said second collar is provided with a plurality of stop members for selective engagement by said second end of said spring member.

7. A trap as claimed in claim 6 wherein said stop members on said first collar comprise a plurality of spaced openings in said first collar for selective engagement by said one end of said spring member.

8. A trap as claimed in claim 7 wherein said stop members on said second collar comprise a plurality of spaced openings in said second collar for selective engagement by said other end of said spring member.

9. A trap holder comprising
a pole;
a flexible limit stop member on said pole, said limit member frictionally engaging said pole at a selected position;
a clamp member located above said limit stop, said clamp member releasably engaging said pole at a selected position;
a trap secured to the clamp member; and
a connecting member having a pair of opposed ends, one end of said connecting member being secured to said limit stop member and the other end of said connecting member being secured to said clamp member, whereby said connecting member will permit only limited upward movement of said clamp member and said limit stop member will permit only limited downward movement of said clamp member.

10. A trap holder as claimed in claim 9 wherein the clamp member comprises:
a seat engaging one side of the pole; and
an adjustable clamp finger for engagement against the other side of the pole on an axis that extends inwardly and upwardly of the pole whereby the clamping force may be adjusted.

11. The trap holder according to claim 10 further comprising: means mounting said clamp finger for swinging movement on the seat so that, if desired, the clamp finger may engage the pole on an axis that is at right angles to the axis of the pole.

12. A device as claimed in claim 9 wherein said limit stop member comprises:
a spring member having a pair of opposed ends;
a first pole engaging member having a pair of opposed ends, one end of said first pole engaging member being integrally attached to one end of said spring member;
a second pole engaging member having a pair of opposed ends, one end of said second pole engaging member being integrally attached to the other end of said spring member;
a first finger engaging member integrally formed on the other end of said first pole engaging member; and
a second finger engaging member integrally formed on the other end of said second pole engaging member, whereby when finger pressure is applied to said first and second finger engaging members said first and second pole engaging members will be moved apart so that the position of said limit stop member on said pole can be adjusted.

* * * * *